Oct. 16, 1934.  W. J. KING  1,977,340
HEAT CONVECTION METER
Filed Aug. 10, 1931
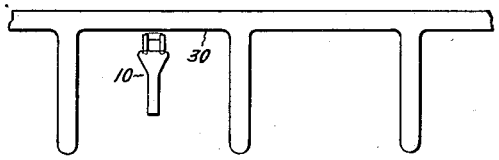
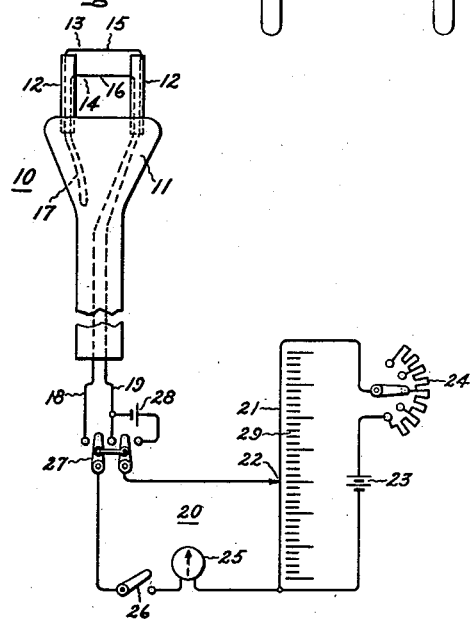
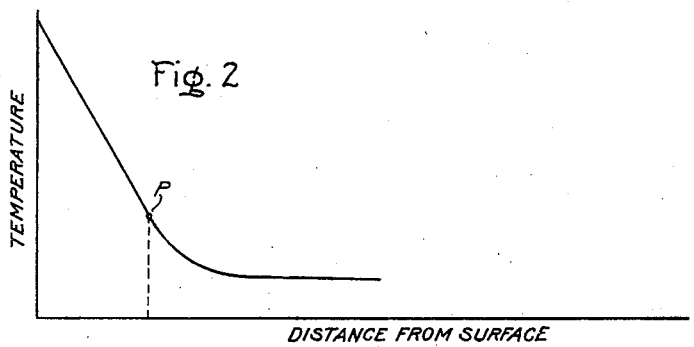
Inventor:
William J. King,
by Charles E. Fuller
His Attorney.

Patented Oct. 16, 1934

1,977,340

UNITED STATES PATENT OFFICE 1,977,340

HEAT CONVECTION METER

William J. King, Schenectady, N. Y., assignor to General Electric Company, a corporation of New York Application August 10, 1931, Serial No. 556,197

6 Claims. (Cl. 73—32)

My invention relates to heat measuring instruments, and particularly to devices for measuring the rates of dissipation of heat from surfaces.

One of the objects of my invention is to provide a device suitable for measuring the rates of dissipation of heat from any element of area of a dissipating surface. Another object of my invention is to provide a device which measures convection independently of radiation. Other and further objects will become apparent as the description proceeds.

The rate of dissipation of heat per unit area from a surface may be obtained by measuring the energy input after conditions have become constant and determining the entire surface of the body dissipating heat. However, this method gives only an average value and does not give an indication of the relative rates of heat dissipation attributable to particular elements of area. Furthermore, the value obtained includes both convection and radiation, so that when a measure of heat dissipated by convection alone is required, it is necessary to calculate the heat dissipated by radiation and subtract this value from the value of the total heat dissipated.

The operation of my device rests upon the discovery that there is a stagnant film of the ambient fluid surrounding the heat dissipating surface in which the temperature gradient remains relatively constant for a short distance from the surface. Since the heat transferred by convection must be initially conducted through the film of fluid adjacent the surface the rate of heat convection may be obtained if the value of the temperature gradient and the thermal conductivity of the film are known. By employing very small thermocouples closely spaced I am enabled to measure the difference in temperatures at two points differing slightly in distance from the surface, and from the value of temperature gradient obtained I may obtain the value of the rate of heat convection, or I may calibrate the device to read directly in terms of heat convection per unit area of dissipating surface.

The features of my invention which I believe to be novel and patentable will be pointed out in the claims appended hereto.

For a better understanding of my invention reference may be had to the accompanying drawing in which Fig. 1 represents one form of apparatus for carrying out the invention; Fig. 2 represents a curve of temperature plotted against distances from the heat dissipating surface, and Fig. 3 illustrates a method of using my device.

Referring to Fig. 1, I provide an exploring unit 10 comprising a stem 11 made of glass or other suitable material, carrying insulating supports 12, and thermocouples 13 and 14 mounted at fixed distances upon supports 12. The thermocouples 13 and 14 are preferably composed of especially fine wire, approximately .05 mm. in diameter, but are otherwise of the type well known in the art, comprising junctions of dissimilar metals at the points 15 and 16. For reasons which will be explained below I prefer to space the thermocouples about three millimeters apart. I employ a lead 17, connecting the thermocouples, of sufficient length to prevent conduction of heat from the hot junction to the cold junction. The insulating supports 12 may be comprised of any suitable material, for example, thoria or quartz. It may be desirable to make the supports flexible in order to keep the wires 13 and 14 of the thermocouples taut in order better to preserve the fixed distance between them. Although I have shown the thermocouple 13 as situated at the extreme end of the insulating supports 12, it will be understood that the insulating supports might also extend a suitable distance beyond the thermocouple 13 in order to protect it against contact with abrasive surfaces. The thermocouples are connected in opposition so that the potential difference set up between the leads 18 and 19 is a measure of the difference in temperature between the thermocouples. Any suitable means for measuring this electromotive force may be provided, but for precise work I prefer to use the potentiometer 20.

The potentiometer 20 comprises resistance 21 illustrated here as a slide wire with an adjustable tap 22, a source of current 23, and a rheostat 24 for adjusting the current flowing through the tapped resistance 21. The potentiometer also includes a galvanometer 25, a switch 26 for opening the galvanometer circuit, double throw switch 27, and a standard cell 28 for calibration purposes. A scale 29 is provided for indicating the position of the tap 22.

The manner of using my device may be seen from Fig. 3 in which the heat dissipating surface is represented at 30. The exploring unit 10 is placed with its tip against or closely adjacent the surface 30, so that the thermojunctions 15 and 16 will lie along a normal to the surface at this point. The curve shown in Fig. 2 represents temperatures in the vicinity of the surface plotted against distances from the surface. The point P on the curve represents conditions at a point three millimeters from the surface. For a distance of slightly over three millimeters from the surface, the temperature of the film adjacent thereto shows a relatively linear variation with distance, and beyond this point as seen from the curve the nature of the variation changes. By measuring the temperatures of any two points falling on the linear portion of the curve, the temperature gradient may be readily obtained since the temperature gradient in the space where the temperature varies linearly with distance is equal to the average temperature difference per millimeter.

In the device shown in Fig. 1, I have so spaced the thermocouples 13 and 14 so that the thermocouple 13 will lie adjacent the surface 30 and the thermocouple 14 will lie at the point represented by P on the curve in Fig. 2.

Before readings are taken double throw switch 27 is moved to the right and switch 26 is closed so as to place the standard cell 28 in circuit with the tapped resistance 21. The adjustable tap 22 is then moved to the point which represents the electromotive force of standard cell 28 and rheostat 24 is adjusted until a zero reading is obtained on potentiometer 25. The double throw switch 27 is then moved to the left and the tap 22 is again adjusted until the galvanometer indicates a zero deflection and the reading is obtained from the scale 29. The scale 29 may be graduated in degrees of temperature as done in the case of thermocouple potentiometers known in the art, or it may be graduated in terms of potential gradient. But I prefer to calibrate the scale directly in terms of watts heat dissipation per square centimeter of surface, or other suitable units such as B. t. u.'s per square inch. If the conductivity coefficient of air is known, the calibration constant may be calculated directly from the potential gradient, or the device may be calibrated in terms of watts dissipation per square centimeter by the use of a small electrically heated test plate of known dimensions and known power input.

By employing fine wires for the thermocouples 13 and 14 the temperature distribution at the points where the explorer is located is not disturbed. The readings of my device are not appreciably affected by radiation, since, according to Langmuir, the absorption of radiant heat by fine metallic wires is negligibly small.

Although I have illustrated my device as used in connection with a potentiometer 20 it will be understood that other potential difference responsive means such as a suitably calibrated milliammeter might also be employed for detecting the electromotive forces induced in the thermocouples 13 and 14.

Although I have described my device as applicable to measurement of heat dissipation, it will be understood that it is also applicable to the measurement of the heat absorption by a cold surface due to convection, as in the case of the evaporators of refrigerator cabinets. Since my device measures the actual rate of heat transferred at the point where the measurement is taken rather than an average value it becomes useful in comparing the effectiveness of various portions of an irregular heat dissipating or absorbing surface, for example, in the vicinity of the fins of radiators.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other arrangements.

What I claim as new and desire to secure by Letters Patent of the United States is:—

1. An instrument for indicating rate of heat transfer from a surface comprising a pair of thermocouples, each consisting of end portions of a pair of wires of dissimilar materials, each joined to the other at one end, said end portions of said wires including the joint formed as aforesaid forming a substantially straight length of wire, said substantially straight lengths being mounted substantially parallel and being adapted to be placed in proximity with said surface at points differing a predetermined amount in distance from said surface measured along a normal to said surface, and means responsive to the difference in the electromotive forces induced in said thermocouples.

2. An instrument for indicating the rate of transfer from a surface of heat transferred solely by convection, said instrument comprising spaced thermocouples, each consisting of end portions of a pair of wires so fine as to be substantially non-responsive to radiant heat, composed of dissimilar materials, and each joined at one end to the other, said end portions of said wires including the joint formed as aforesaid forming a substantially straight length of wire, said substantially straight lengths being mounted substantially parallel and being adapted to be placed in proximity with said surface at points differing a predetermined amount in distance from said surface, and means responsive to the difference in the electromotive forces induced in said thermocouples.

3. An instrument indicating rate of heat transfer from a surface comprising a pair of thermocouples, each consisting of end portions of a pair of wires of dissimilar materials, each joined to the other at one end, said end portions of said wires including the joint formed as aforesaid forming a substantially straight length of wire, said substantially straight lengths being mounted substantially parallel and being adapted to be placed in proximity with said surface at points differing a predetermined amount in perpendicular distance from said surface, and means for comparing the difference in the electromotive forces induced in said thermocouples with the electromotive force of a standard cell.

4. An appliance adapted to measure the rate of heat transfer from an element of a surface exposed to a fluid heat transferring medium, said appliance comprising a pair of spaced thermocouples, each consisting of end portions of a pair of wires of dissimilar materials, each joined to the other at one end, said end portions of said wires including the joint formed as aforesaid forming a substantially straight length of wire, said substantially straight lengths being mounted substantially parallel and being adapted to be placed in proximity with said element of surface at points differing approximately three millimeters in distance from said surface and located within a stagnant layer of fluid adjacent said surface, and means responsive to the difference in the electromotive forces induced in said thermocouples.

5. An instrument responsive to the rate of heat transfer by conduction through a stagnant fluid medium, comprising a pair of spaced thermocouples, each consisting of end portions of a pair of wires so fine as to be substantially non-responsive to radiant heat, composed of dissimilar materials, and each joined at one end to the other, said end portions of said wires including the joint formed as aforesaid forming a substantially straight length of wire, said substantially straight lengths being mounted substantially parallel and being adapted to be so placed in said medium as to make said thermocouples responsive to the temperature gradient of said medium in the direction of heat transfer, and means for obtaining an indication dependent upon said temperature gradient.

6. An instrument for indicating rate of heat transfer from a surface comprising a pair of thermocouples, each consisting of the end portions of a pair of wires composed of dissimilar materials, each joined at one end to the other, stretched between and supported by a pair of flexible posts serving to keep said wires taut with a fixed and relatively small air space between said thermocouples, one of said thermocouples being mounted substantially at the ends of said posts, and portable means for supporting said posts, adapting said thermocouples to be placed in proximity with said surface at points differing a predetermined amount in distance from said surface, and means responsive to the difference in electromotive forces induced in said thermocouples.

WILLIAM J. KING.